United States Patent

[11] 3,631,275

[72] Inventors  Kenneth W. Conrad;
               Ronald W. Albers, both of Davenport;
               Elmer M. Deters, Muscatine, all of Iowa
[21] Appl. No. 38,975
[22] Filed     May 20, 1970
[45] Patented  Dec. 28, 1971
[73] Assignee  Red Jacket Manufacturing Company
               Davenport, Iowa

[54] SUBMERSIBLE MOTOR COMPONENTS UNIT FOR A SUBMERSIBLE ELECTRIC MOTOR
     9 Claims, 10 Drawing Figs.
[52] U.S. Cl................................................... 310/71,
                                                  310/43, 310/87
[51] Int. Cl.......................................................H02b 11/00
[50] Field of Search............................................ 310/87, 43,
          68, 68.4, 71; 417/410, 422, 423, 424; 339/60, 94

[56]              References Cited
              UNITED STATES PATENTS
2,967,960   1/1961   Waldschmidt................   310/87 X

| 3,248,582 | 4/1966 | Brown............................ | 310/87 |
| 3,180,267 | 4/1965 | Bemmann et al............. | 310/68 X |
| 2,286,993 | 6/1942 | Naul............................... | 310/43 X |
| 2,883,566 | 4/1959 | Briggs............................ | 310/87 |
| 2,944,297 | 7/1960 | Maynard...................... | 310/43 |

Primary Examiner—D. F. Duggan
Assistant Examiner—B. A. Reynolds
Attorney—McCanna, Morsbach, Pillote & Muir ABSTRACT: A submersible motor components unit for a submersible electric motor in which the submersible motor has a plug-type disconnect at one end and the motor components unit is detachably mounted on the end of the submersible motor. The submersible motor components unit has a molded plastic outer housing detachably mounted on the motor and filled with a resinous potting material around the motor components to provide a unitary resinous body that encloses the motor components and seals the same from the surrounding medium.

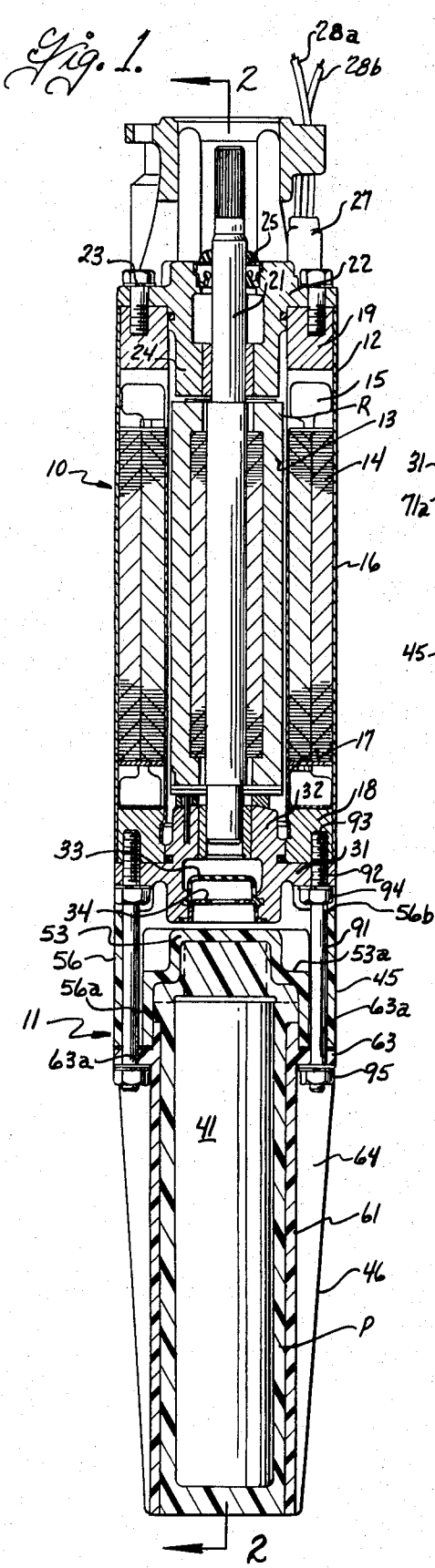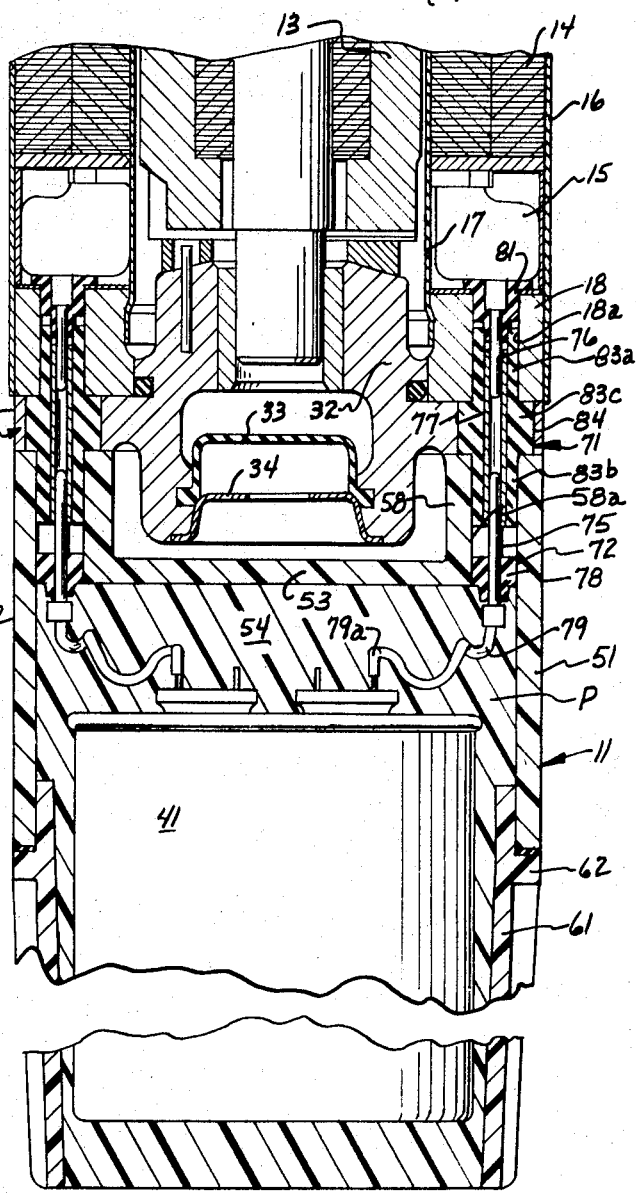

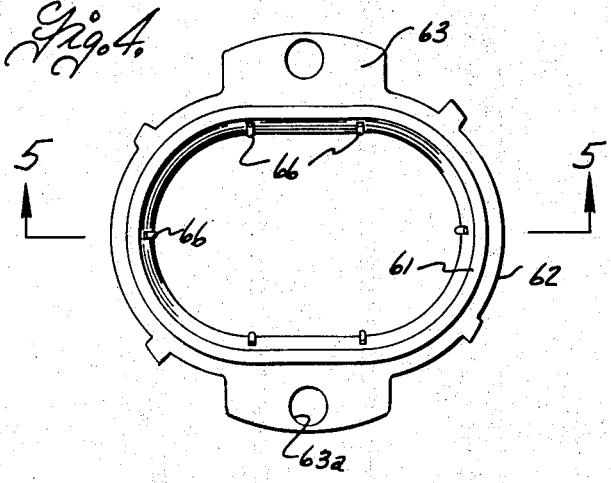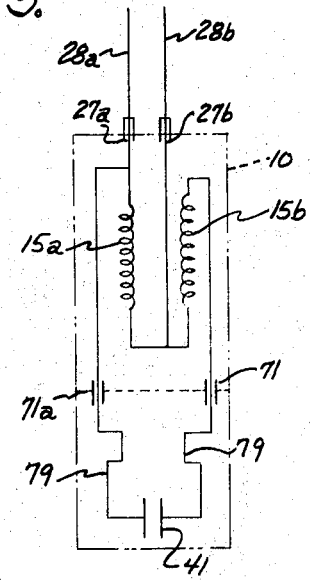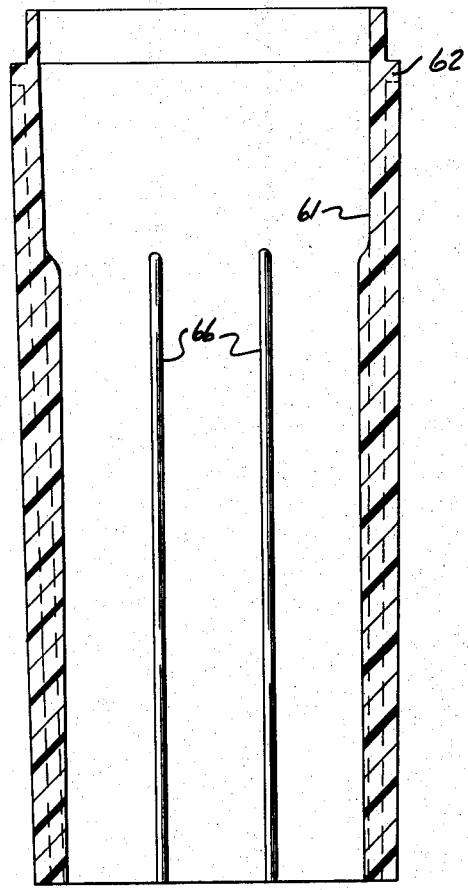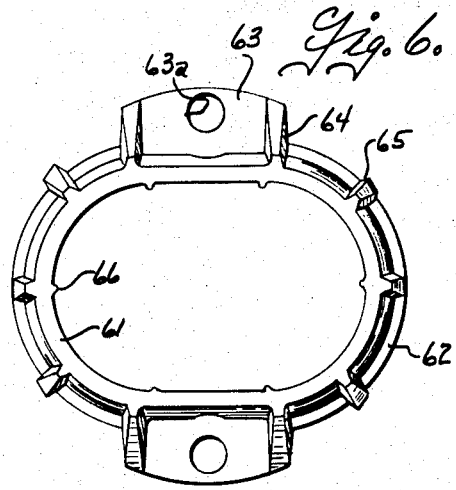

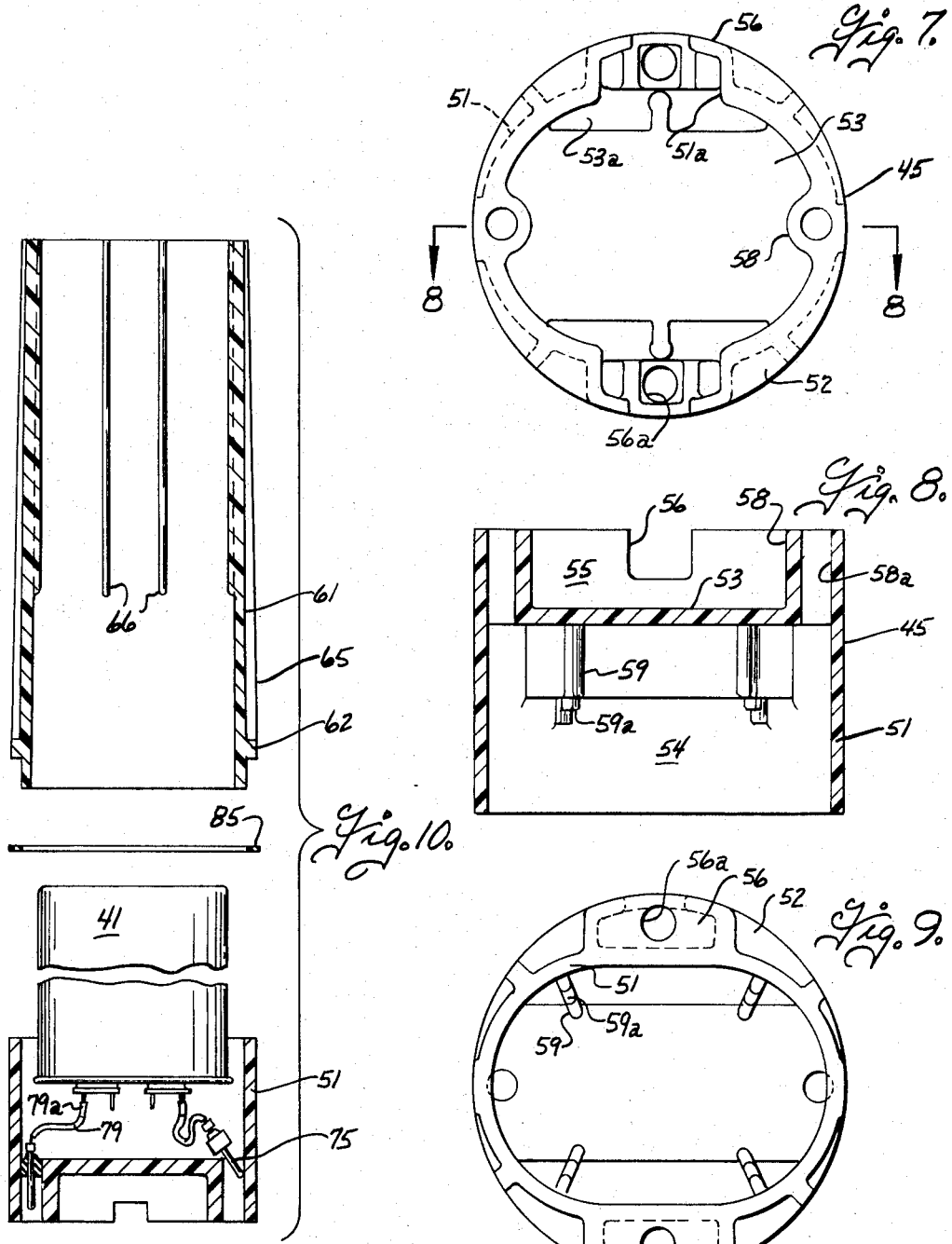

3,631,275

SUBMERSIBLE MOTOR COMPONENTS UNIT FOR A SUBMERSIBLE ELECTRIC MOTOR

BACKGROUND

In submersible motor installations, it is frequently desirable to locate some of the motor control components such as a motor capacitor in the well with the submersible motor. In order to facilitate service checking of the motor and motor control components and replacement of the same if necessary, it is heretofore been proposed as disclosed in U.S. Pat. No. 3,248,582 entitled "Submersible Motor With Detachable Capacitor and Housing," assigned to the assignee of the present invention, to mount the motor capacitor in a housing separate from the motor and to detachably connect the motor capacitor to the motor through a plug-type disconnect. With the apparatus disclosed in the aforementioned patent, it was unnecessary to open the motor enclosure in order to service or replace the motor capacitor. However, if the motor capacitor did require replacement, it was necessary to open the capacitor housing; remove and replace the defective capacitor, and then reclose and reseal the capacitor housing. Accordingly, replacement of a defective motor capacitor remained a time consuming task that was difficult to perform under conditions in the field.

In accordance with the present invention, a disposable submersible motor components unit is provided. The disposable submersible motor components unit includes a plastic housing having plug-type disconnect means on one end arranged to interfit with a plug-type disconnect on the motor, and the motor components are disposed within the plastic housing and encapsulated in a resinous potting material that fills the housing around the components. Fasteners detachably mount the motor components housing on the motor so that the components unit can be separated from the motor to facilitate checking of the components. The motor components unit with the plastic housing and potting material can be economically fabricated so that, if the motor component such as the capacitor is defective, the entire unit can be discarded and merely replaced with a new unit.

Various important objects of this invention are to provide a disposable submersible motor components unit for use with a submersible electric motor, which submersible motor components unit is of simple and economical construction; which can be easily and economically fabricated; and which will reliably seal the motor components from the surrounding medium even in the event of a crack or fracture in the components housing.

These, together with other objects and advantages of this invention will become apparent from the following description when taken in connection with the accompanying drawings wherein:

FIG. 1 is a longitudinal sectional view through a submersible motor and motor components unit embodying the present invention;

FIG. 2 is a fragmentary sectional view taken on the plane 2—2 of FIG. 1 and showing parts of the motor and components unit;

FIG. 3 is a diagrammatic view illustrating the electrical circuit of the motor and components unit;

FIG. 4 is a view of the upper end of the lower housing section;

FIG. 5 is a sectional view through the lower housing section taken on the plane 5—5 of FIG. 4;

FIG. 6 is a view of the bottom of the lower housing section;

FIG. 7 is a view of the upper end of the upper housing section;

FIG. 8 is a sectional view through the upper housing section taken on the plane 8—8 of FIG. 7;

FIG. 9 is a view of the lower end of the upper housing section; and

FIG. 10 is an exploded sectional view through the housing of the motor components unit.

Referring now more specifically to FIG. 1 of the accompanying drawings there is shown a submersible motor capacitor unit including a submersible electric motor 10, having a submersible motor components unit 11 detachably mounted thereon and connected to the motor windings. As shown, the motor 10 includes a stator body 12 defining a rotor chamber R and a rotor 13 disposed in the stator body. The stator body has a laminated core structure 14 and motor windings 15, and which core and windings are disposed within an imperforate outer shell 16. The motor windings 15 are preferably sealed and, for this purpose, an inner tubular liner 17 is disposed within the stator core and end rings 18 and 19 are provided at opposite ends of the stator and sealed to the outer shell and to the liner to form a sealed-in closure for the stator windings. The rotor 13 is disposed in the stator and has a rotor shaft 21 extending therefrom outwardly of the motor enclosure for connection to a pump (not shown). A motor end member 22 overlies the stator ring member 19 and is removably fastened thereto as by bolts 23. The motor end member 22 also includes a bearing hub 24 which rotatably supports one end of the rotor shaft 21, and a shaft seal 25 is mounted on the end member 22 and engages the shaft 25 to seal the interface with the shaft. As disclosed in the aforementioned patent, the plug-in-type disconnect 27 is advantageously provided at the upper end of the motor to enable disconnection of the power supply conductors 28a and 28b from the motor field windings. An end member 31 is mounted on the lower end of the stator body and carries a bearing hub 32 that rotatably supports the lower end of the rotor shaft 21. The rotor chamber R is customarily filled with a fluid (not shown) having suitable insulating and lubricating characteristics and, in order to accommodate thermal expansion and contraction of the fluid, a movable wall or expansion chamber 33 is mounted on the end member 31 and has one side exposed to the fluid in the rotor chamber and the other side exposed to the surrounding medium, such as the water in a well so as to equalize the pressure on the fluid in the motor with that in the well.

As diagrammatically shown in FIG. 3, the windings 15 of the motor 10 include a main winding 15a and a start winding 15b. Motor control components such ad the motor capacitor 41 are mounted in the components unit 11 which is detachably mounted on the motor and electrically connected to the motor windings through plug-type disconnects.

The motor components unit 11 is fabricated to provide an economical enclosure for the motor components which reliably seals the same against the surrounding medium and such that, in the event of failure of the motor components, the components unit itself can be thrown away and replaced with a new motor components unit. More particularly, the motor components unit includes an outer housing of molded plastic and having a first or upper housing section 45 which is adapted to abut against the lower end of the motor and which contains the plug-in disconnects and a second or lower housing section 46 which interfits with the upper housing section and which defines an enclosure for the motor component such as the capacitor 41. After assembly of the motor components in the housing and connection of the same to the plug-type disconnects in the upper housing section, the housing section, the housing is filled with a resinous potting material which forms a unitary body around the motor components and seals the same from the surrounding medium. Further, the resinous potting material provides improved thermal conductivity to dissipate heat which may build up in the motor component such as the capacitor. While various different resinous potting or encapsulating materials such as casting resins and epoxy resins can be used, epoxy resins are presently preferred.

The first housing section has a peripheral sidewall 51 of generally oblong cross section, and which side wall terminates at its upper end in an outwardly extending flange 52 having a generally circular outer periphery. The flange 52 has an outer diameter generally corresponding to that of the lower end member 31 on the motor and is adapted to abut thereagainst An end wall 53 is formed integrally with the side wall 51 intermediate the upper and lower ends thereof and defines a lower generally cupr shaped chamber 54 below the end wall 53 and upper cavity 55 above the end wall. The end wall 53 is stepped downwardly as shown at 53a along opposite sides thereof and the sidewalls 51 are provided with openings 51a to allow the surrounding fluid such as the water in the well to enter the cavity 55 above the end wall 53. Bolt receiving bosses 56 are provided along opposite sides of the upper housing section, adjacent the minor transverse axis of the oblate sidewall 51, which bolt receiving openings 56a extending therethrough. As best shown in FIGS. 1, 7 and 9, the bolt receiving bosses 56 are conveniently cored out so as to be hollow, to reduce the overall amount of material utilized to make the housing section, and the upper end of the boss 56 has a lateral opening 56b therethrough to allow the surrounding fluid to enter the cavity 55 above the end wall. At least one, and preferably two, socket forming bosses 58 are formed integrally with the sidewall 51 adjacent the major transverse dimension of the same, which socket forming bosses extend upwardly from the end wall 53 and have passages 58a extending therethrough to communicate with the lower chamber 54. Stepped reinforcing and component positioning ribs 59 are provided on the inner side of the side wall 51 and have stepped lower faces 59a for engagement with the motor component such as the capacitor to support the same in spaced relation to the side and end walls 51 and 53.

The upper housing section 45 is made in the form of a relatively shallow cup to facilitate assembly of the motor components and plug-type disconnects in the housing, and a lower housing section 46 is arranged to interfit with the upper section to form an enclosure for the components. The lower housing section has a sidewall 61 of oblong cross section and arranged to interfit with the lower portion of the sidewall 51, and an outwardly extending rim or bead 62 is provided on the outer side of the wall 61 and arranged to engage the lower end of the sidewall 51 of the upper housing section. Mounting flanges 63 are formed integrally with the rim 62 and extend laterally from the sidewall 61 adjacent the minor transverse dimension thereof, which flanges have bolt receiving openings 63a for receiving the mounting bolts described hereinafter. Reinforcing and guide ribs 64 are advantageously provided along opposite sides of the housing section 63 and taper upwardly and outwardly from the lower end of the housing section to the outer edges of the flanges 63. Additional reinforcing ribs 65 are advantageously provided at spaced points around the housing section to aid in spacing the motor components such as the capacitor from the housing section.

The plug-in-type electrical disconnects utilized for electrically connecting motor components to the motor supply lines and field windings are preferably of the type disclosed and claimed in the copending application Ser. No. 38,976, of Kenneth W. Conrad and Elmer M. Deters entitled "Submersible Motor Connector Assembly," filed May 2, 1970, and assigned to the assignee of the present invention. As disclosed in that application, separate plug-type disconnect units designated 71 and 71a are provided for each conductor. It is to be understood, however, that different plug-type disconnect means could be utilized and that the connectors and all of the conductors could be located in a single unit, if desired. As more fully disclosed in that application, the disconnect units 71 and 71a are of similar construction and each include a first prong-type disconnect element 75 on the motor components housing; a second prong-type disconnect element 75 on the motor components housing; a second prong-type disconnect element 75 on the motor components housing; a second prong-type disconnect element 76 carried by the motor, and a double-ended connector member 77 for interconnecting the prong elements 75 and 76. The prong elements 75 are mounted in resilient plugs 78 formed of an elastomeric material such as rubber and have a snug fit in the inner ends of the sockets 58a in the housing 51 sufficient to seal the interface between the plugs and the housing. As shown in FIG. 2, prongs 75 are connected as by conductors 79 to the motor capacitor. Prong-type connectors 76 are also mounted in resilient plugs 81 of rubber or the like disposed in bores 18a formed in the end rings 18. The plugs 78 and 81 close and seal the inner ends of the bores and define plug-receiving sockets.

A double-ended connector member 77 is provided for electrically connecting the prongs and for sealing the sockets from the surrounding medium. The connector member comprises a tubular conductor forming a double-ended female connector for receiving the prongs 75 and 76 and the connector element is disposed in a resilient body having plug portions 83a and 83b at the ends extending into the sockets 18a and 58a on the registering faces of the end ring and housing 51 respectively. An enlarged intermediate portion 83c is provided on the body and disposed in an opening 84 in the end member. The opening 84 on the end member has a cross section larger than the sockets so as to define opposed shoulders and the intermediate portion has an axial thickness slightly greater than the spacing between the opposed shoulders to be axially compressed when the housing is clamped to the motor, to thereby seal the interface between the housing and motor around the electrical connectors. Forming of the components housing in two sections facilitates molding the housing and markedly facilitates assembly of the components and connectors in the housing. Thus, as shown in FIG. 10, the components unit can be readily assembled by inserting the prongs 75 into the plugs 78 and the prongs and plugs can then be inserted into the inner ends of the sockets or bores 58 a to close and seal the bores. Since the upper housing section forms a relatively shallow chamber, the conductors 79 can be made relatively short and need only be of a length slightly greater than the depth of the chamber to allow assembly of the conductors on the terminals of the motor capacitor, as by press-on connectors 79a. The second housing section 71 thereafter telescopically interfitted with the first housing section to complete the enclosure around the motor control component. A gasket 85 formed of fiber or the like can be provided at the interface between the shoulder 62 and the end of the housing 51 to inhibit leakage of potting material during the subsequent potting step. The housing section 61 is preferably open at its lower end so that the housing section 61 is preferably open at its lower end so that the housing enclosure can be thereafter easily filled with a resinous potting material, preferably of the epoxy type. The plugs 78 are cleaned prior to assembly so that the body of potting material, such as epoxy resin will bond readily to the plugs and form a unitary body P around the motor components which is sealed to the plugs. As will be seen from FIGS. 1 and 2, the lower housing section has a cross section, smaller than the largest cross section of the upper housing section, so that the lower housing section acts to hold the solidified body P in position.

Tie bolts 91 are provided for attaching the components housing to the motor. As best shown in FIG. 1, the tie bolts 91 are disposed outside of the chamber in the housing section and extend through openings 63 in the flanges 63 of the lower housing section; upwardly through the passages 56a in the bosses 56 on the upper housing section, and through openings 92 in the end member 31 into tapped bores 93 in the end ring. Nuts 94 are provided on the bolts 91 for securing the end members to the end rings and nuts 95 are provided on the lower ends of the bolts to secure the components unit to the motor. As will be seen, the bolts aid in holding the housing sections in assembled relation.

The multiple section housing not only facilitates molding of the housing and assembly of the motor components and connectors therein, but additionally reduces the possibility of destroying the sealed enclosure around the motor components, in the event of damage to the housing prior to or during insertion of the motor pump unit into the well. Thus, all electrical connections of the conductors 79 to the motor components and to the connectors 58a are disposed within the upper housing section so that fractures in the lower housing section will not adversely affect the sealed enclosure. Further, since the resinous body is bonded to the plugs 78, any water which may creep by capillary action between the housing and the resinous body will not adversely affect the motor components or connectors. Moreover, since the bolts engage flanges on the lower housing section to hold the upper housing section against the motor, there is less likelihood of damage to the upper housing section, in the event the lower section strikes an obstruction.

The embodiments of the invention in which an exclusive property or privilege is claimed are defined as follows:

1. A disposable submersible motor components unit for use with s submersible electric motor having a rotor and a stator surrounding the rotor, motor field windings in the stator, and a first plug-type disconnect means on the lower end of the stator; said motor components unit including a plastic outer housing having sidewall means and an end wall means closing one end of the housing, said end wall means having a connector passage extending therethrough to register with the plug-type disconnect means on the motor, a second plug-type disconnect means on the components housing including an elastomeric plug extending into said opening in said end wall means and sealing said opening and an electrical connector element mounted in said plug, a motor capacitor in said housing and spaced from the side and end walls thereof, conductor means in the housing electrically connecting said motor capacitor to said electrical connector element, a resinous potting material filling said chamber around said capacitor and conductor means and bonded to said elastomeric plug forming a unitary resinous body enclosing said capacitor and conductor means and sealing the same from the surrounding medium and fastener means engaging said outer housing for detachably mounting the motor components unit on the motor.

2. A disposable submersible motor components unit for use with a submersible electric motor having a rotor and an annular stator surrounding the rotor, motor field windings in the stator, and a first plug-type electrical disconnect means at one end of the motor, said motor components unit comprising a plastic outer housing including a first housing section having one end thereof adapted for engagement with said one end of the motor and an opening in said one end of said first housing section arranged to register with the first plug-type electrical disconnect means on said one end of the motor, a second plug-type electrical disconnect means on the components housing including an elastomeric plug extending into said opening and sealing said opening and an electrical connector element mounted in said plug, said plastic outer housing including a second housing section extending from the other end of said first housing section to form a motor components chamber therewith, motor control component means disposed within said housing, conductor means connecting said motor control component means to said second electrical disconnect means on said first housing section, a resinous potting material filling said first and second housing sections around said motor control component means and conductor means and bonded to said elastomeric plug forming a unitary resinous body enclosing said motor control component means and sealing the same from contact with the surrounding medium, and mounting means engaging said second housing section and adapted for connection to the motor for securing said motor components unit to the motor.

3. The combination of claim 2 wherein said first housing section includes end wall means and sidewall means around said end wall means defining a generally cup-shaped first housing section.

4. A submersible motor components unit for use with a submersible electric motor having a rotor and an annular stator surrounding the rotor, motor field windings in the stator, and a first electrical disconnect means at one end of the motor, said motor components unit including a first housing section having one end thereof adapted for engagement with said one end of the motor and a second electrical disconnect mounted in said one end of said first housing section to register with the first electrical disconnect means on said one end of the motor, said first housing section including end wall means and sidewall means around said end wall means defining a generally cup-shaped first housing section, a second housing section extending from the other end of said first housing section to form a motor components chamber therewith, motor control component means disposed within said housing, conductor means connecting said motor control component means to said second electrical disconnect means on said first housing section, a resinous potting material filling said first and second housing sections around said motor control component means forming a unitary resinous body enclosing said motor control component means and sealing the same from contact with the surrounding medium, said second housing section having lug means externally of said motor components chamber, and mounting means including tie bolts engaging said lug means on said second housing section and extending alongside said sidewall means of said first housing section and adapted for connection to the motor for securing said motor components unit to said one end of the motor.

5. A submersible motor components unit for use with a submersible electric motor having a rotor and an annular stator surrounding the rotor, motor field windings in the stator, and a first electrical disconnect means at one end of the motor, said motor components unit including a first housing section having one end thereof adapted for engagement with said one end of the motor and a second electrical disconnect mounted in said one end of said first housing section to register with the first electrical disconnect means on said one end of the motor, said first housing section including end wall means and sidewall means around said end wall means defining a generally cup-shaped first housing section, a second housing section extending from the other end of said first housing section to form a motor components chamber therewith, said first and second housing sections having telescopically interfitting parts on the adjacent ends thereof, motor control component means disposed within said housing, conductor means connecting said motor control component means to said second electrical disconnect means on said first housing section, a resinous potting material filling said first and second housing sections around said motor control component means forming a unitary resinous body enclosing said motor control component means and sealing the same from contact with the surrounding medium, and mounting means engaging said second housing section and adapted for connection to the motor for securing said motor components unit to the motor.

6. A submersible motor components unit for use with a submersible electric motor having a rotor and an annular stator surrounding the rotor, motor field windings in the stator, and a first electrical disconnect means at the lower end of the motor, said motor components unit including a first plastic housing section having end wall means adapted for engagement with the lower end of the motor and sidewall means extending downwardly around said end wall means and terminating at an open lower end, a second plastic housing section having its upper end engaging the lower end of the first section and extending downwardly therefrom to define a components chamber with the first section, a second electrical disconnect means on said end wall means arranged to register with said first disconnect means on the motor, said second housing sections having lugs extending laterally from said one end thereof outwardly of said chamber, tie bolts engaging said lugs on said second housing section and extending alongside the sidewalls of said first housing section for attaching the unit to the motor, a motor capacitor disposed in said chamber and having conductor means connecting the same to said second electrical disconnect means, and a resinous potting material filling said chamber around said motor capacitor and conductor means forming a unitary resinous body enclosing said motor capacitor and sealing the same from contact with the surrounding medium.

7. The combination of claim 6 wherein said end wall means has an opening therethrough registering with the first electrical disconnect means on the motor, said second electrical disconnect means including a plug body of resilient material in said opening and a connector element in said plug body, said plug body being sealed to said body of resinous potting material.

8. The combination of claim 6 wherein said housing sections have locating ribs on the inner sides thereof for spacing said motor capacitor from the walls of said first and second housing sections.

9. The combination of claim 6 wherein the sidewalls of said first and second housing sections have a generally oblate cross section, said lugs on said second section extending laterally from adjacent the minor cross-sectional dimension of said second housing section.

* * * * *